(12) United States Patent
Ueki et al.

(10) Patent No.: US 10,760,641 B2
(45) Date of Patent: Sep. 1, 2020

(54) VIBRATION DAMPING DEVICE

(71) Applicant: BRIDGESTONE CORPORATION, Tokyo (JP)

(72) Inventors: Akira Ueki, Tokyo (JP); Yuki Satake, Tokyo (JP); Masakazu Nagasawa, Tokyo (JP); Yasuyuki Nagashima, Tokyo (JP); Hideki Sugawara, Tokyo (JP); Shingo Oono, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 4 days.

(21) Appl. No.: 16/093,893

(22) PCT Filed: Jun. 16, 2017

(86) PCT No.: PCT/JP2017/022258
§ 371 (c)(1),
(2) Date: Oct. 15, 2018

(87) PCT Pub. No.: WO2017/221818
PCT Pub. Date: Dec. 28, 2017

(65) Prior Publication Data
US 2019/0107171 A1   Apr. 11, 2019

(30) Foreign Application Priority Data

Jun. 23, 2016   (JP) .................. 2016-124915

(51) Int. Cl.
*F16F 9/34* (2006.01)
*F16F 13/10* (2006.01)
*B60K 5/12* (2006.01)

(52) U.S. Cl.
CPC .......... *F16F 13/107* (2013.01); *B60K 5/1208* (2013.01); *F16F 2224/025* (2013.01)

(58) Field of Classification Search
CPC .......................... F16F 9/34; F16F 13/104–108
(Continued)

(56) References Cited

U.S. PATENT DOCUMENTS

| 4,277,056 A | * | 7/1981 | Ticks | F16F 13/08 |
| | | | | 267/140.13 |
| 4,483,521 A | * | 11/1984 | Kakimoto | F16F 13/107 |
| | | | | 267/140.13 |

(Continued)

FOREIGN PATENT DOCUMENTS

| CN | 103620258 A | 3/2014 |
| CN | 104847837 A | 8/2015 |

(Continued)

OTHER PUBLICATIONS

International Search Report of PCT/JP2017/022258 dated Aug. 29, 2017.
(Continued)

*Primary Examiner* — Christopher P Schwartz
(74) *Attorney, Agent, or Firm* — Sughrue Mion, PLLC

(57) ABSTRACT

A restricted passageway (24) is provided with a first communication part (26) which is formed in a first barrier wall (34) facing a first liquid chamber and opens to the first liquid chamber, a second communication part (27) which is formed in a second barrier wall (35) facing a second liquid chamber and opens to the second liquid chamber, and a main body flow path (25) that is configured to cause the first communication part (26) and the second communication part (27) to communicate with each other. At least one of the first communication part (26) and the second communication part (27) includes a plurality of fine holes (26a) that pass through the first barrier wall (34) or the second barrier wall (35). A vortex chamber (29) is disposed in a connection portion with at least one of the first communication part (26) and the second communication part (27) on the main body (Continued)

flow path (25), figured to form the swirling flow of a liquid depending on a flow velocity of the liquid from the other of the first communication part (26) and the second communication part (27), and is configured to cause the liquid to flow out through the fine holes (26a).

4 Claims, 5 Drawing Sheets

(58) Field of Classification Search
   USPC .............. 267/140.13–140.15, 140.2–140.5, 267/141.1–141.7; 248/550, 562
   See application file for complete search history.

(56) References Cited

U.S. PATENT DOCUMENTS

| | | | |
|---|---|---|---|
| 4,739,962 A * | 4/1988 | Morita | F16F 9/34 |
| | | | 267/140.13 |
| 4,903,951 A * | 2/1990 | Miyamoto | F16F 13/103 |
| | | | 267/140.13 |
| 5,009,404 A * | 4/1991 | Hirazawa | F16F 13/105 |
| | | | 267/140.13 |
| 5,094,433 A * | 3/1992 | Dan | F16F 13/105 |
| | | | 138/30 |
| 6,036,183 A | 3/2000 | Lee et al. | |
| 9,926,997 B2 * | 3/2018 | Ueki | F16F 13/105 |
| 10,066,695 B2 * | 9/2018 | Ueki | F16F 13/08 |
| 10,221,916 B2 * | 3/2019 | Ueki | F16F 13/107 |
| 2012/0074629 A1 * | 3/2012 | Yamamoto | F16F 13/106 |
| | | | 267/140.13 |
| 2014/0103586 A1 | 4/2014 | Tsutsumi | |
| 2015/0233443 A1 | 8/2015 | Lemaire et al. | |
| 2016/0053845 A1 * | 2/2016 | Ueki | B60K 5/1208 |
| | | | 267/140.13 |

FOREIGN PATENT DOCUMENTS

| | | |
|---|---|---|
| EP | 3 026 292 A1 | 6/2016 |
| JP | 2012-172832 A | 9/2012 |
| WO | 2014/196382 A1 | 12/2014 |
| WO | 2016/027606 A1 | 2/2016 |

OTHER PUBLICATIONS

Extended European Search Report dated May 24, 2019 issued by the European Patent Office in counterpart application No. 17815286.4.

Search Report dated Oct. 22, 2019 from the State Intellectual Property Office of the P.R.C. in application No. 2017800293790.

* cited by examiner

VIBRATION DAMPING DEVICE

TECHNICAL FIELD

The present invention relates to a vibration damping device that is applied to, for instance, a vehicle or an industrial machine, and absorbs and damps vibrations of a vibration generating part such as an engine.

Priority is claimed on Japanese Patent Application No. 2016424915, filed Jun. 23, 2016, the content of which is incorporated herein by reference.

BACKGROUND ART

As such a type of vibration damping device, a constitution that includes: a first mounting member that is coupled to any one of the vibration generating part and the vibration receiving part and has a tubular shape, and a second mounting member that is coupled to the other; an elastic body that elastically couples the mounting members; and a partition member that partitions a liquid chamber, which is inside the first mounting member and is sealed with a liquid, into a main liquid chamber and an auxiliary liquid chamber is known. The partition member is formed with a restricted passageway that causes the main liquid chamber and the auxiliary liquid chamber to communicate with each other. In the vibration damping device, when vibrations are input, the mounting members are displaced relative to each other while elastically deforming the elastic body, and a liquid pressure of the main liquid chamber is changed. A liquid circulates through the restricted passageway. Thereby, the vibrations are absorbed and damped.

Meanwhile, in the vibration damping device, after a large load (vibration) is input from, for instance, irregularities of a road surface, and the liquid pressure of the main liquid chamber is abruptly raised, when the load is input in a reverse direction by rebound or the like of the elastic body, the main liquid chamber may undergo abrupt conversion into negative pressure. Then, due to the conversion into negative pressure, cavitation by which numerous air bubbles are generated in the liquid is caused. Furthermore, due to cavitation collapse in which the generated air bubbles collapse, abnormal sound may occur.

Therefore, like the vibration damping device disclosed in, for instance, Patent Document 1 below, a constitution in which a valve body is provided in the restricted passageway, and thereby conversion of the main liquid chamber into the negative pressure is suppressed even when vibration having a large amplitude is input is known.

CITATION LIST

Patent Document

[Patent Document 1]
Japanese Unexamined Patent Application, First Publication No. 2012-172832

SUMMARY OF INVENTION

Technical Problem

However, in the conventional vibration damping device, because the valve body is provided, a structure is complicated, acid tuning of the valve body is also required. Thus, there is a problem that manufacturing costs are increased. Because the valve body is provided, the degree of freedom of design is reduced. As a result, there is a possibility of vibration damping characteristics being reduced.

The present invention was made in view of these circumstances, and an object thereof is to provide a vibration damping device capable of suppressing occurrence of abnormal sound caused by cavitation collapse with a simple structure without reducing vibration damping characteristics.

Solution to Problem

A vibration damping device according to the present invention is a liquid-sealed vibration damping device, and includes: a first mounting member having a tubular shape coupled to any one of a vibration generating part or a vibration receiving part and, and a second mounting member coupled to the other rest of the vibration generating part or the vibration receiving part that is not coupled to the first mounting member; an elastic body elastically coupling the first and second mounting members; and a partition member partitioning a liquid chamber that is inside the first mounting member and is sealed with a liquid into a first liquid chamber and a second liquid chamber. The partition member is formed with a restricted passageway that causes the first liquid chamber and the second liquid chamber to communicate with each other, and the restricted passageway includes a first communication part that is formed in a first barrier wall facing the first liquid chamber and opens to the first liquid chamber, a second communication part that is formed in a second barrier wall facing the second liquid chamber and opens to the second liquid chamber, and a main body flow path that causes the first communication part and the second communication part to communicate with each other. At least one of the first communication part and the second communication part includes a plurality of fine holes that pass through the first barrier wall or the second barrier wall, and a vortex chamber is disposed in a connection portion of the main body flow path with at least one of the first communication part and the second communication part, forms a swirling flow of the liquid depending on the flow velocity of the liquid from the other of the first communication part and the second communication part, and is configured to cause the liquid to flow out through the fine holes.

Effects of Invention

According to the present invention, occurrence of abnormal sound caused by cavitation collapse can be suppressed with a simple structure without reducing vibration damping characteristics.

DESCRIPTION OF EMBODIMENTS

Hereinafter, an embodiment of a vibration damping device according to the present invention will be described with reference to FIGS. 1 to 5.

Figure 1:
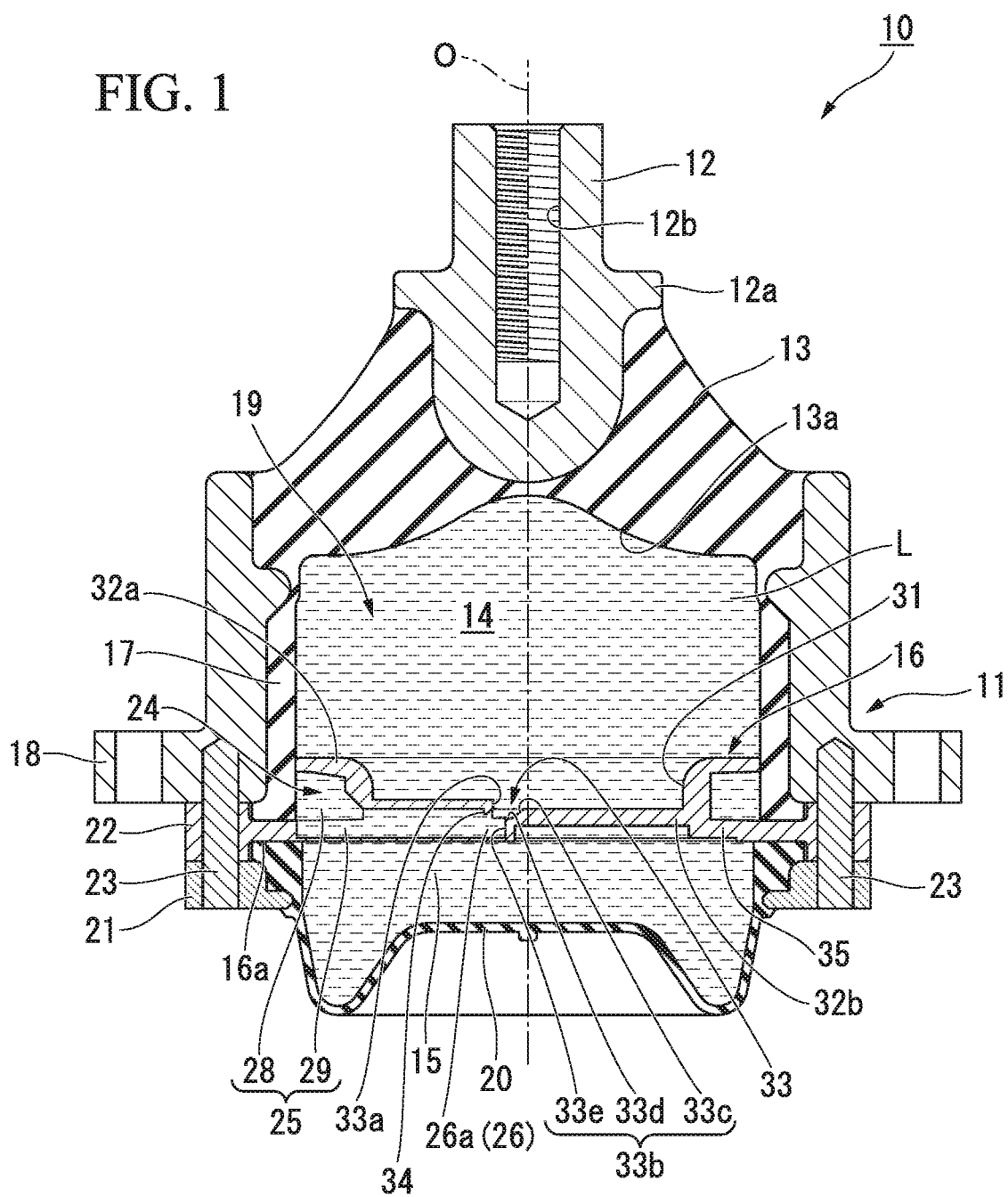
FIG. 1 is a longitudinal sectional view of a vibration damping device according to an embodiment of the present invention.

As shown in FIG. 1, a vibration damping device 10 is a liquid-sealed vibration damping device that includes a first mounting member 11 having a tubular shape that is coupled to any one of a vibration generating part or a vibration receiving part, a second mounting member 12 that is coupled to the other rest of the vibration generating part and the vibration receiving part that is not coupled to the first mounting member 11, an elastic body 13 that elastically couples the first mounting member 11 and the second mounting member 12, and a partition member 16 that partitions the inside of the first mounting member 11 into a main liquid chamber (a first liquid chamber) 14 and an auxiliary liquid chamber (a second liquid chamber) 15, both of which will be described below.

Hereinafter, a central axis of the first mounting member 11 is referred to as a central axis O, and a direction parallel to the central axis O is referred to as an axial direction. The vicinity of the second mounting member 12 parallel to the axial direction is referred to as an upper side, and the vicinity of the partition member 16 parallel to the axial direction is referred to as a lower side.

In the top view showing the vibration damping device 10 in the axial direction, a direction around the central axis O is referred to as a circumferential direction.

Each of the first mounting member 11, the second mounting member 12, and the elastic body 13 is formed in a circular or annular shape in the top view, and simultaneously is disposed on the same axis as the central axis O.

When the vibration damping device 10 is mounted on, for instance, a vehicle, the second mounting member 12 is coupled to an engine acting as the vibration generating part, and the first mounting member 11 is coupled to a vehicle body acting as the vibration receiving part. Thereby, vibrations of the engine are inhibited from being transmitted to the vehicle body.

The second mounting member 12 is a columnar member that extends in the axial direction, and has a lower end formed in a hemispherical shape, and a flange part 12a above the hemispherical lower end. A screw hole 12b is drilled in an upper portion of the second mounting member 12, and extends downward from an upper end face of the upper portion, and a bolt (now shown) acting as a mounting tool for the engine is configured to be screwed into the screw hole 12b. The second mounting member 12 is disposed close to an opening of an upper end of the first mounting member 11 via the elastic body 13.

The elastic body 13 is a rubber body that is vulcanized and bonded to the opening of the upper end of the first mounting member 11 and an outer circumferential surface of the lower end of the second mounting member 12, and is interposed therebetween, and blocks the opening of the upper end of the first mounting member 11 from the upper side. An upper end of the elastic body 13 comes into contact with the flange part 12a of the second mounting member 12. Thereby, the elastic body 13 sufficiently adheres to the second mounting member 12, and is made to more excellently follow displacement of the second mounting member 12. A rubber membrane 17, which liquid-tightly covers an inner circumferential surface of the first mounting member 11 and a part of an edge of an opening of a lower end of the first mounting member 11 is integrally formed at a lower end of the elastic body 13. An elastic body formed of, for instance, a synthetic resin in addition to rubber can also be used as the elastic body 13.

The first mounting member 11 is formed in a cylindrical shape in which the lower end thereof has a flange 18, and is coupled to, for instance, the vehicle body acting as the vibration receiving part via the flange 18. On the inside of the first mounting member 11, a portion located under the elastic body 13 becomes a liquid chamber 19. In the present embodiment, the partition member 16 is provided inside the lower end of the first mounting member 11, and furthermore a diaphragm 20 is provided below the partition member 16.

The diaphragm 20 is formed of an elastic material such as rubber or a soft resin, and is formed in a bottomed cylindrical shape. An upper end of the diaphragm 20 is interposed between the partition member 16 and a ring-shaped holder 21 located below the partition member 16 in the axial direction. A flange part 22 is formed on an outer circumference of the partition member 16, and an upper surface of the holder 21 comes into contact with a lower surface of the flange part 22. The flange part 22 is provided at a lower end of an outer circumferential surface of the partition member 16. An upper surface of an inner circumferential portion of the flange part 22 liquid-tightly comes into contact with a lower end of the rubber membrane 17.

With this constitution, the flange part 22 of the partition member 16 and the holder 21 disposed downward at the edge of the opening of the lower end of the first mounting member 11 in that order, and are fixed by screws 23. Thereby, the diaphragm 20 is mounted on the opening of the lower end of the first mounting member 11 via the partition member 16. In the present embodiment, the diaphragm 20 has a shape in which the bottom thereof is deep at an outer circumferential side thereof and is shallow in the center thereof. However, as the shape of the diaphragm 20, various well-known conventional shapes can be adopted in addition to this shape.

In this way, the diaphragm 20 is mounted on the first mounting member 11 via the partition member 16, and thereby the liquid chamber 19 is formed inside the first mounting member 11 as described above. The liquid chamber 19 is arranged in the first mounting member 11, that is, inside the first mounting member 11 in the top view, and thus becomes a sealed space that is liquid-tightly sealed by the elastic body 13 and the diaphragm 20. The liquid chamber 19 is encapsulated (filled) with a liquid L.

The liquid chamber 19 is partitioned into the main liquid chamber 14 and the auxiliary liquid chamber 15 with the partition member 16. The main liquid chamber 14 is formed such that a lower surface 13a of the elastic body 13 is used as a part of a wall surface thereof. Thus, the main liquid chamber 14 is a space surrounded by the partition member 16 and the rubber membrane 17 that liquid-tightly covers the elastic body 13 and the inner circumferential surface of the first mounting member 11, and an internal volume thereof is changed by deformation of the elastic body 13. The auxiliary liquid chamber 15 is a space surrounded by the diaphragm 20 and the partition member 16, and an internal volume thereof is changed by deformation of the diaphragm 20. The vibration damping device 10 configured in this way is a compression type device that is mounted such that the main liquid chamber 14 is located on the upper side in a vertical direction and the auxiliary liquid chamber 15 is located on the lower side in the vertical direction when used.

The outer circumferential surface of the partition member 16 is fitted into the first mounting member 11 via the rubber membrane 17. Thereby, a space between the rubber membrane 17 and the partition member 16 is liquid-tightly blocked.

A recess 31 is formed in an upper surface of the partition member 16. The recess 31 is disposed on the same axis as the central axis O. The recess 31 is formed in a circular shape in the top view showing the partition member 16 from above. The recess 31 formed in the partition member 16 has an annular outer circumferential portion 32a and a plate-shaped central portion 32b that blocks the inside of the outer circumferential portion 32a. The outer circumferential portion 32a is formed between a lateral surface of the recess 31 and the outer circumferential surface of the partition member 16. The central portion 32b is formed between a bottom surface of the recess 31 and a lower surface of the partition member 16, and is smaller (thinner) than the outer circumferential portion 32a in the axial direction.

The partition member 16 is provided with a restricted passageway 24 that allows the main liquid chamber 14 and the auxiliary liquid chamber 15 to communicate with each other. The restricted passageway 24 includes a main body flow path 25 that is disposed in the partition member 16, a first communication part 26 that allows the main body flow path 25 and the main liquid chamber 14 to communicate with each other, and a second communication part 27 that allows the main body flow path 25 and the auxiliary liquid chamber 15 to communicate with each other.

Figure 2:
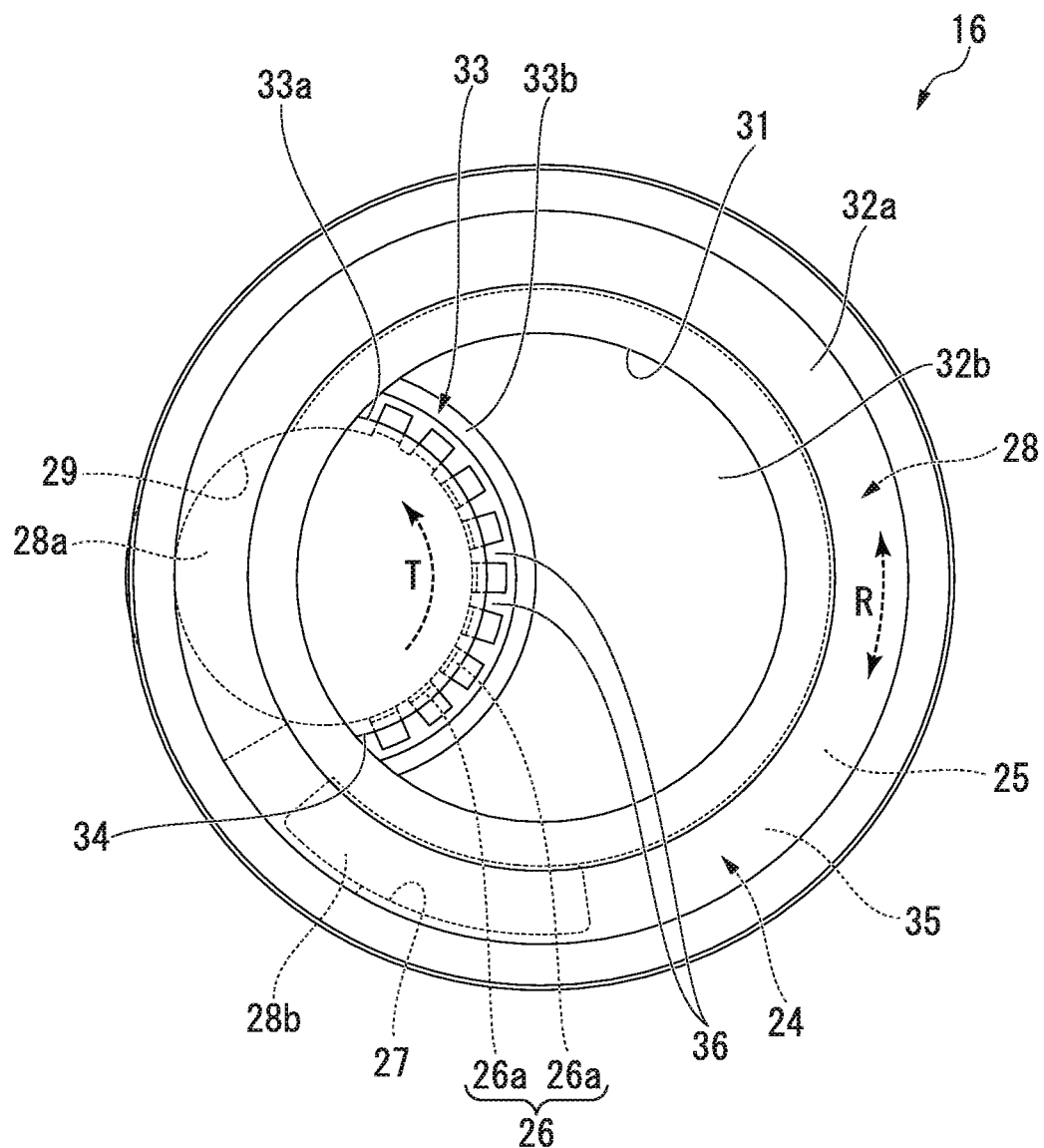
FIG. 2 is a top view of a partition member that constitutes the vibration damping device shown in FIG. 1.
Figure 3:
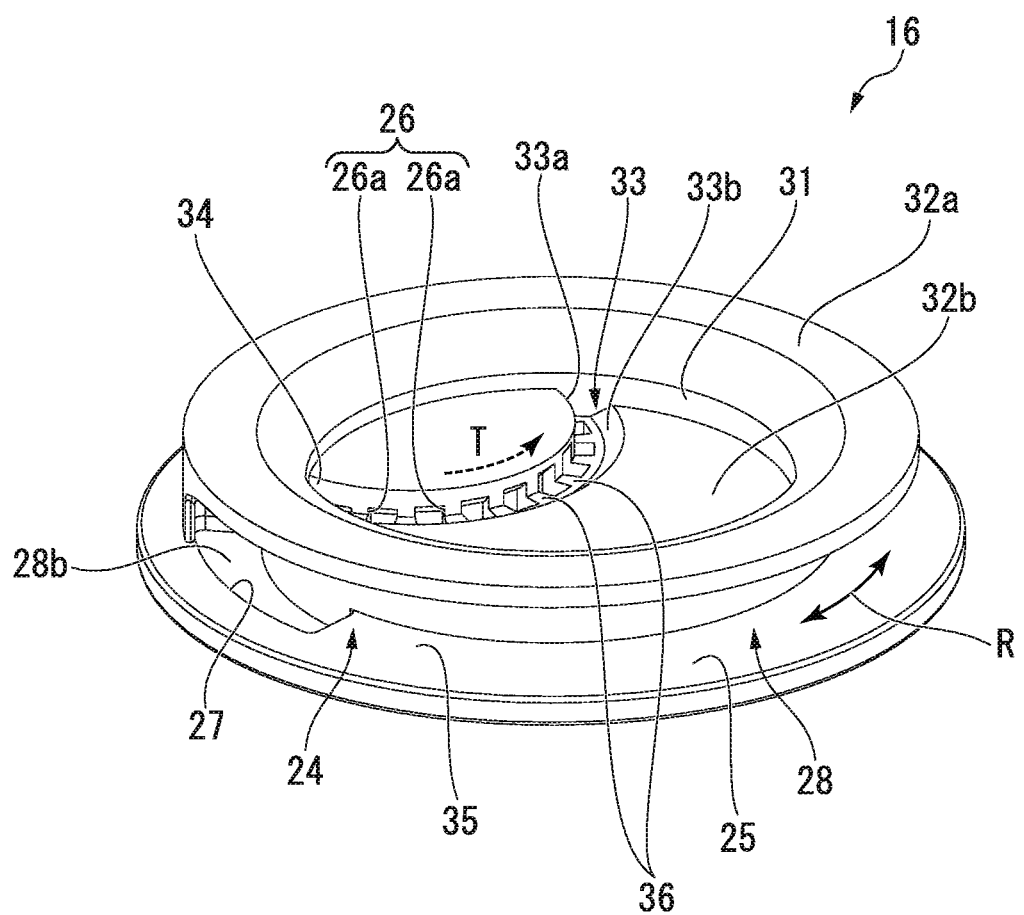
FIG. 3 is a perspective view of the partition member shown in FIG. 2.

As shown in FIG. 2, the main body flow path 25 includes a rectification path 28 and a vortex chamber 29. The rectification path 28 is formed in the outer circumferential surface of the partition member 16 in a circumferential groove shape. The rectification path 28 extends along at least a semi-circumference of the outer circumferential surface of the partition member 16. The rectification path 28 is formed in the outer circumferential portion 32a. In the rectification path 28, a flow path direction R of the restricted passageway 24 is a circumferential direction.

The vortex chamber 29 is provided at a first end 28a of two ends of the rectification path 28 in the circumferential direction. The first end 28a becomes a connection portion with the vortex chamber 29 on the rectification path 28.

Figure 4:
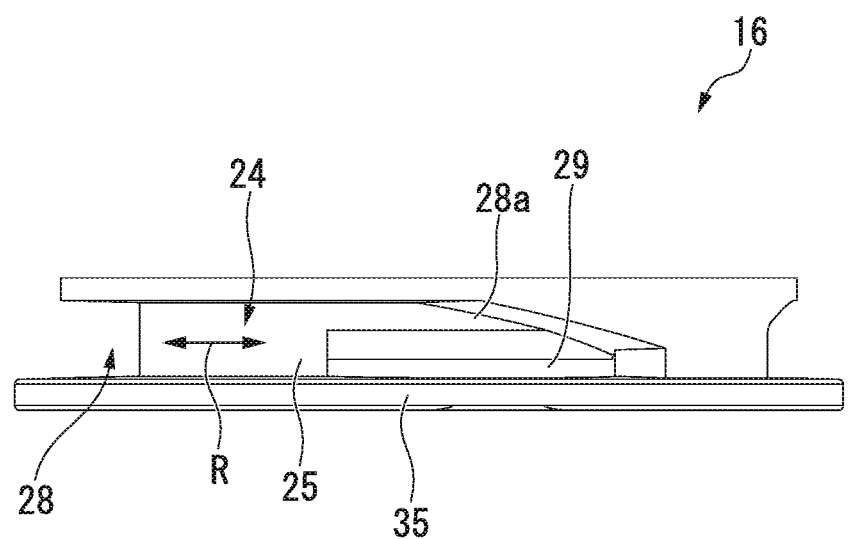
FIG. 4 is a side view of the partition member shown in FIG. 2.

As shown in FIG. 4, a flow path cross-sectional area of the first end 28a is reduced in proportion to the distance from the second communication part 27 in the flow path direction R. The first end 28a is narrowed in the axial direction in proportion to the distance from the second communication part 27 in the flow path direction R.

As shown in FIG. 2, the vortex chamber 29 is provided to partly cover the outer circumferential portion 32a and the central portion 32b. The vortex chamber 29 is formed in a circular shape in the top view. An inner circumferential surface of the vortex chamber 29 is formed at an outer circumferential edge of the vortex chamber 29 in the top view. The diameter of the vortex chamber 29 is smaller than that of the partition member 16, and a central axis of the vortex chamber 29 is located away from the central axis O. In the top view, the outer circumferential edge of the vortex chamber 29 is inscribed in the outer circumferential surface of the partition member 16.

The vortex chamber 29 forms a swirling flow of the liquid L depending on a flow velocity of the liquid L from the rectification path 28. When the flow velocity of the liquid L flowing into the vortex chamber 29 is low, swirling of the liquid L in the vortex chamber 29 is suppressed. However, when the flow velocity of the liquid L is high, the swirling flow of the liquid L in the vortex chamber 29 is formed. The swirling flow swirls in a direction around the central axis of the vortex chamber 29. That is, a swirling direction T of the swirling flow of the liquid L which is formed by the vortex chamber 29 becomes the direction around the central axis the vortex chamber 29 in the top view showing the vibration damping device 10 in the axial direction.

A front side in the swirling direction T becomes a counterclockwise side in the top view, and a rear side in the swirling direction T becomes a clockwise side in the top view. Hereinafter, in the top view showing the vibration damping device 10 in the axial direction, a direction perpendicular to the central axis of the vortex chamber 29 is referred to as a radial direction for swirling.

Figure 5:
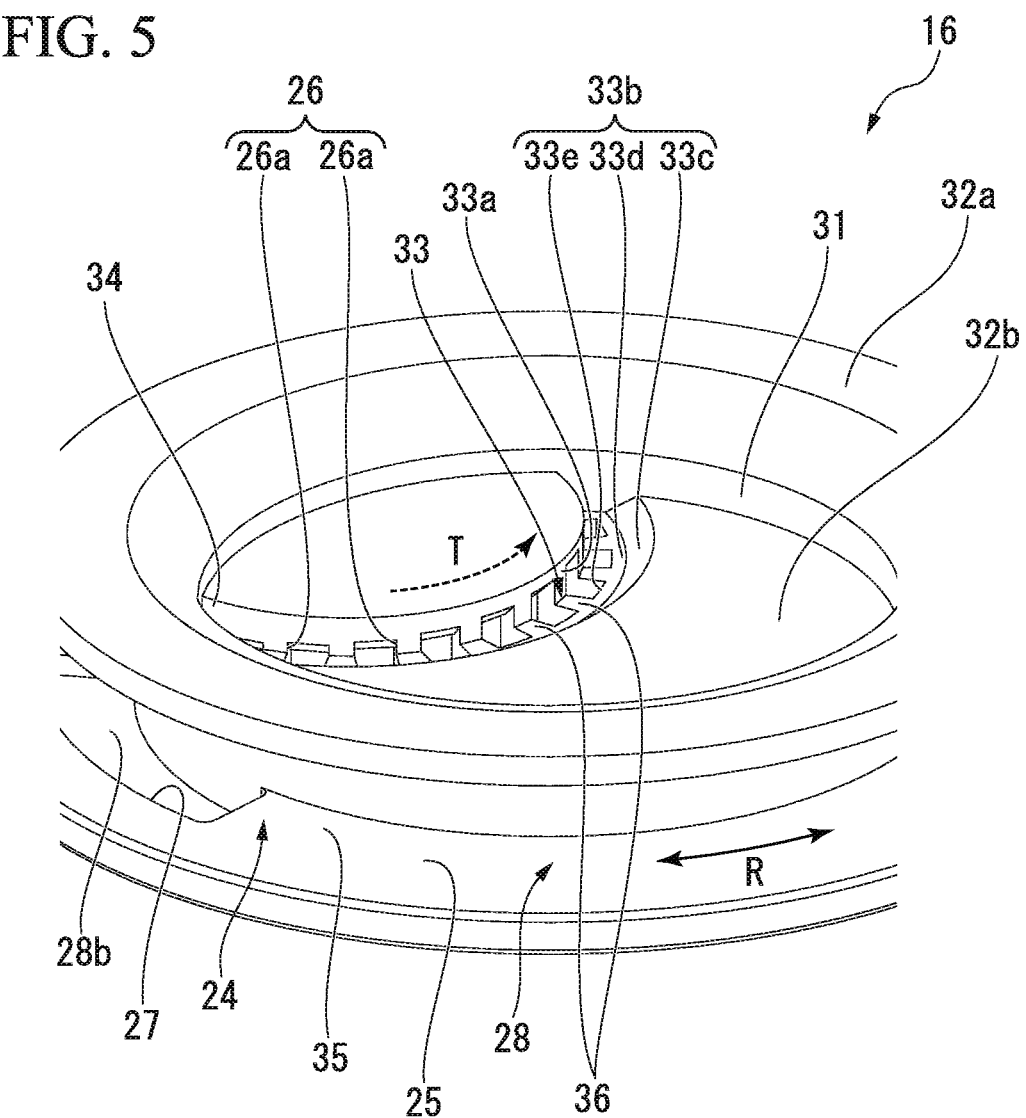
FIG. 5 is an enlarged perspective view of key parts of the partition member shown in FIG. 2.

As shown in FIG. 5, a groove 33 is formed in the bottom surface of the recess 31. The groove 33 extends in the swirling direction T. The groove 33 is formed in an arcuate shape in the top view. The groove 33 is disposed along the outer circumferential edge of the vortex chamber 29 in the top view. In the top view, opposite ends of the groove 33 reach the lateral surface of the recess 31, and the groove 33 partitions the bottom surface of the recess 31 into two regions.

As shown FIGS. 1 and 5, of lateral surfaces of the groove 33, a first lateral surface 33a which is directed outward in the radial direction for swirling extends in parallel to the axial direction. Of the lateral surfaces of the groove 33, a second lateral surface 33b which is directed inward in the radial direction for swirling includes an oblique surface 33c, a horizontal surface 33d, and a vertical surface 33e. The oblique surface 33c, the horizontal surface 33d, and the vertical surface 33e are provided from top to bottom in that order. The oblique surface 33c gradually extends inward in the radial direction for swirling from top to bottom. The horizontal surface 33d extends inward in the radial direction for swirling from a lower end of the oblique surface 33c. The vertical surface 33e extends downward from an inner end of the horizontal surface 33d in t radial direction for swirling. The bottom surface of the groove 33 is disposed to be flush with the lower surface of the vortex chamber 29.

As shown in FIG. 5, the partition member 16 includes a first barrier wall 34 that faces the main liquid chamber 14, and a second barrier wall 35 that faces the auxiliary liquid chamber 15. The first barrier wall 34 is formed by a portion of the partition member 16 which is located between the inner circumferential surface of the vortex chamber 29 and the first lateral surface 33a. The first barrier wall 34 extends in the swirling direction T. The second barrier wall 35 is formed by a portion of the partition member 16 which is located between an inner surface of the rectification path 28 and the lower surface of the partition member 16. The second barrier wall 35 extends in the flow path direction R.

The first communication part 26 is formed in the first barrier wall 34, and opens to the main liquid chamber 14. The second communication part 27 is formed in the second barrier wall 35, and opens to the auxiliary liquid chamber 15.

At least one of the first communication part 26 and the second communication part 27 includes a plurality of fine holes 26a that pass through the first barrier wall 34 or the second barrier wall 35. In the present embodiment, the first communication part 26 includes the plurality of fine holes 26a that pass through the first barrier wall 34.

The plurality of fine holes 26a are disposed in the first barrier wall 34 in the swirling direction T. The plurality of fine holes 26a are disposed at intervals in the swirling direction T. The fine holes 26a pass through the first barrier wall 34 in the radial direction for swirling. All openings of the plurality of fine holes 26a which are directed toward the main liquid chamber 14 are formed in rectangular shapes that extend in the axial direction in the front view from the outside in the radial direction for swirling. Lower ends of the fine holes 26a are located at the lower surface of the vortex chamber 29 (the bottom surface of the groove 33). Flow path cross-sectional areas of the plurality of fine holes 26a gradually increase from the inside to the outside in a flow path length direction of the fine holes 26a (in the shown example, in the radial direction for swirling).

A ratio of an opening area or a projection area of a minimum cross section in the fine holes 26a occupied per predetermined area in the first barrier wall 34 gradually increases from the rear side to the front side in the swirling direction T. "Projection area" refers to a projection area directed in a direction in which a fine hole center line passing the center of the minimum cross section in the fine holes 26a extends to a surface of the first barrier wall 34 which is located in the main liquid chamber 14. "Projection area" in the present embodiment refers to a projection area to the first lateral surface 33a of the minimum cross sections of the fine holes 26a in the radial direction for swirling (in the flow path length direction).

In the present embodiment, widths of the plurality of fine holes 26a in the circumferential direction are made identical to one another. The plurality of fine holes 26a are disposed at equal intervals in the circumferential direction. Lengths of the plurality of fine holes 26a in the axial direction gradually increase from the rear side to the front side in the swirling direction T. Thereby, the ratio gradually increases from the rear side to the front side in the swirling direction T.

In the shown example, portions of the first lateral surface 33a which avoid the fine holes 26a are provided with bridge parts 36 that connect the first lateral surface 33a and the second lateral surface 33b. Lower surfaces of the bridge parts 36 are fixed to the bottom surface of the groove 33, and upper surfaces of the bridge parts 36 are funned to be flush with the horizontal surface 33d.

The second communication part 27 passes through the second barrier wall 35 in the axial direction. The second communication part 27 is formed in a long rectangular shape in the flow path direction R. The second communication part 27 opens to the second end 28b of the rectification path 28.

In the restricted passageway 24, the main body flow path 25 allows the first communication part 26 and the second communication part 27 to communicate with each other. The vortex chamber 29 is formed in a connection portion with the first communication part 26 that is at least one of the first communication part 26 and the second communication part 27 on the main body flow path 25. The vortex chamber 29 forms the swirling flow of the liquid L depending on the flow velocity of the liquid L from the vicinity of the second communication part 27 that is the other of the first communication part 26 and the second communication part 27, and allows the liquid L to flow out through the fine holes 26a.

In the vibration damping device 10 configured in this way, when the vibrations are input, the mounting members 11 and 12 are relatively displaced while elastically deforming the elastic body 13. Then, a liquid pressure of the main liquid chamber 14 is changed, and the liquid L in the main liquid chamber 14 flows into the auxiliary liquid chamber 15 through the restricted passageway 24, and the liquid L in the auxiliary liquid chamber 15 flows into the main liquid chamber 14 through the restricted passageway 24. That is, some of the liquid L in the auxiliary liquid chamber 15 returns to the main liquid chamber 14.

According to the vibration damping device 10 according to the present embodiment, in the case in which a great load (vibration) is input to the vibration damping device 10, when the liquid L from the vicinity of the second communication part 27 flows into the vortex chamber 29, the flow velocity of the liquid L is sufficiently high, and the swirling flow of the liquid L is formed in the vortex chamber 29. Then, pressure loss of the liquid L caused by, for instance, energy loss caused by forming the swirling flow and energy loss caused by a friction between the liquid L and the wall surface of the vortex chamber 29 can be increased. Furthermore, when the liquid L flows out through the plurality of fine holes 26a, the liquid L circulates in the fine holes 26a while the liquid L is subjected to pressure loss due to the first barrier wall 34 in which the fine holes 26a are formed, and a rise in the flow velocity of the liquid L circulating in the plurality of fine holes 26a can be suppressed. Moreover, since the liquid L circulates in not a single fine hole 26a but a plurality of fine holes 26a, the liquid L can diverge into a plurality of flows and circulate, and the flow velocity of the liquid L passing through the individual fine holes 26a can be reduced. Thereby, a difference in flow velocity between the liquid L that passes the fine holes 26a to flow into the main liquid chamber 14 and the liquid L in the main liquid chamber 14 is suppressed to be small, and generation of vortex caused by the difference in flow velocity and generation of air bubbles caused by this vortex can be suppressed. Furthermore, even if the air bubbles are generated, the plurality of fine holes 26a are disposed, and thus the generated air bubbles can be separated. Mergence and growth of the air bubbles are suppressed, so that the air bubbles can be easily maintained in a finely dispersed state. Even if the air bubbles are generated not in the main liquid chamber 14 but in the restricted passageway 24, when the air bubbles pass the fine holes 26a, the air bubbles can be divided into fine air bubbles, and then be dispersed.

As described above, the generation of air bubbles itself can be suppressed. For example, even if the air bubbles are generated, the air bubbles can be easily maintained in a finely dispersed state. Thus, even if cavitation collapse in which the air bubbles collapse is generated, generated abnormal sound can be suppressed to be small.

When the swirling flow of the liquid L is formed in the vortex chamber 29, pressure loss of the liquid L occurs, and thus the flow velocity of the liquid L is gradually reduced from the rear side to the front side in the swirling direction T. That is, as the liquid L by which the swirling flow is formed is located at the rear side in the swirling direction T, an inertial force directed outward in the radial direction for swirling is great.

Here, the ratio gradually increases from the rear side to the front side in the swirling direction T, and the ratio can be suppressed at the rear side in the swirling direction T at which the flow velocity of the liquid L is high. Therefore, the liquid L by which the swirling flow is formed is inhibited from flowing out of the vortex chamber 29 through the fine holes 26a located at the rear side in the swirling direction T among the plurality of fine holes 26a due to the inertial force acting on the liquid L, and the liquid L can also flow out of the fine holes 26a located at the front side in the swirling direction T. Thereby, a large quantity of liquid L can be inhibited from locally flowing out of the fine holes 26a located at the rear side in the swirling direction T at a high speed, and the liquid L flows out of all the plurality of fine holes 26a while suppressing a variation in flow velocity, so that the generation of air bubbles can be effectively suppressed.

As the fine holes 26a become closer to the front side in the swirling direction T the projection area or the opening area of the minimum cross section in the plurality of fine holes 26a becomes larger. Thus, a structure in which the ratio gradually increases from the rear side to the front side in the swirling direction T can be reliably realized with a simple structure.

Since the flow path cross-sectional area of the first end 28a is gradually reduced in proportion to the distance from the second communication part 27 in the flow path direction R, circulation resistance gradually increases in a process of the liquid L circulating through the first end 28a, and the flow velocity of the liquid L is suppressed. Thereby, the flow velocity of the liquid L flowing into the vortex chamber 29 can be decreased, and the liquid L can be reliably inhibited from flowing out of the fine holes 26a located at the rear side in the swirling direction T due to the inertia.

The technical scope of the present ion is not limited to the above embodiment, and the present invention may be modified in various ways without departing from the spirit or teaching thereof.

In the above embodiment, the vortex chamber 29 is formed in the connection portion with the first communication part 26 on the main body flow path 25, but the present invention is not limited thereto. For example, the vortex chamber 29 may be formed in the connection portion with the second communication part 27 on the main body flow path 25. In this case, a constitution in which, instead of the first communication part 26 including the plurality of fine holes 26a, the second communication part 27 includes a plurality of fine holes disposed parallel to the swirling direction T can be adopted. In this case, a ratio of a projection area and an opening area of a minimum cross section in the fine holes occupied per predetermined area in the second barrier wall 35 may gradually increase from the rear side to the front side in the swirling direction T. In this case, as the fine holes become closer to the front side in the swirling direction T, the projection area and the opening area of the minimum cross section in the plurality of fine holes may become larger. In this case "projection area" refers to a projection area directed in a direction in which a fine hole center line passing the center of the minimum cross section in the fine holes extends to a surface of the second barrier wall 35 which is located in the auxiliary liquid chamber 15.

Furthermore, the vortex chamber 29 may be formed in both of the connection portion with the first communication part 26 and the connection portion with the second communication part 27 on the main body flow path 25.

In the above embodiment, as the fine holes 26a become closer to the front side in the swirling direction T, the projection area and the opening area of the minimum cross section in the plurality of fine holes 26a may become larger. Thereby, the ratio gradually increases from the rear side to the front side in the swirling direction T, but the present invention is not limited thereto.

For example, an interval between the fine holes adjacent to each other in the swirling direction T is gradually narrowed from the rear side to the front side in the swirling direction T. Thereby, the ratio may gradually increase from the rear side to the front side in the swirling direction T.

As the fine hole 26a become closer to the rear side in the swirling direction T, flow path lengths of the plurality of fine holes 26a may become longer.

In the above embodiment, the flow path cross-sectional area at the first end 28a is gradually reduced in proportion to the distance from the second communication part 27 in the flow path direction R. However, the flow path cross sectional area at the second end 28b may be gradually reduced in proportion to the distance from the first communication part 26 in the flow path direction R.

In the above embodiment, each of the fine holes 26a is formed in a rectangular shape, but it mays be formed in a columnar or conical shape.

In the above embodiment, the fine holes 26a are disposed in one layer in the axial direction, but the fine holes 26a may be disposed in two or more layers in the axial direction.

In the above embodiment, the main body flow path 25 (the rectification path 28) is disposed to extend in the circumferential direction, but the present invention is not limited thereto.

In the above embodiment, the partition member 16 is disposed at the lower end of the first mounting member 11, and the flange part 22 is brought into contact with a lower end face of the first mounting member 11. However, for example, the partition member 16 is disposed above the lower end face of the first mounting member 11 at a sufficient distance, and the diaphragm 20 is arranged at the lower side of the partition member 16, that is, at the lower end of the first mounting member 11. Thereby, the auxiliary liquid chamber 15 may be configured to be formed from the lower end of the first mounting member 11 to the bottom surface of the diaphragm 20.

In the above embodiment, the compression type vibration damping device 10 on which a support load acts so that a positive pressure acts on the main liquid chamber 14 has been described. However, the present invention can also be applied to a hanging type vibration damping device which is mounted such that the main liquid chamber 14 is located at the lower side in the vertical direction and the auxiliary liquid chamber 15 is located at the upper side in the vertical direction, and on which a support load acts so that a negative pressure acts on the main liquid chamber 14.

In the above embodiment, the partition member 16 partitions the liquid chamber 19 inside the first mounting member 11 into the main liquid chamber 14 having the elastic body 13 at a part of the wall surface thereof and the auxiliary liquid chamber 15, but the present invention is not limited thereto. For example, a pair of elastic bodies 13 may be provided in the axial direction instead of providing the diaphragm 20, and a pressure receiving liquid chamber having the elastic bodies 13 at parts of the wall surface thereof may be provided instead of providing the auxiliary liquid chamber 15. For example, the partition member 16 partitions the liquid chamber 19 that is inside the first mounting member 11 and is encapsulated with the liquid L into the first liquid chamber 14 and the second liquid chamber 15, and at least one of the first liquid chamber 14 and the second liquid chamber 15 can be appropriately changed into another constitution having the elastic body 13 at a part of the wall surface thereof.

The vibration damping device 10 according to the present invention is not limited to an engine mount of a vehicle, and can also be applied to anything but the engine mount. For example, the vibration damping device 10 can also be applied to a mount of an electric generator mounted in the construction machine, or a mount of a machine installed in a factory or the like.

According to the present invention, when the vibrations are input, the mounting members are relatively displaced while elastically deforming the elastic body. Thus, the liquid pressure of the first liquid chamber is changed, and the liquid is made to circulate between the first liquid chamber and the second liquid chamber through the restricted passageway. In this case, the liquid flows into the main body flow path through one of the first communication part and the second communication part, and then flows out of the main body flow path through the other of the first communication part and the second communication part.

Here, in the case in which the great load (the vibration) is input to the vibration damping device, when the liquid from the other of the first communication part and the second communication part flows into the vortex chamber provided in the connection portion with one of the first communication part and the second communication part, the flow velocity of the liquid is sufficiently high, and the swirling flow of the liquid is formed in the vortex chamber. Then, the pressure loss of the liquid caused by, for instance, the energy loss caused by forming the swirling flow and energy loss caused by a friction between the liquid and the wall surface of the vortex chamber can be increased. Furthermore, when the liquid flows out through the plurality of fine holes provided on the first communication part or the second communication part, the liquid circulates in the fine holes while being subjected to pressure loss due to the first barrier wall or the second barrier wall in which the fine holes are formed, and the rise in the flow velocity of the liquid circulating in the plurality of fine holes can be suppressed. Furthermore, since the liquid circulates in not a single fine hole but a plurality of fine holes, the liquid can diverge into a plurality of flows and circulate, and the flow velocity of the liquid passing through the individual fine holes can be reduced. Thereby, the difference in flow velocity between the liquid that passes the fine holes to flow into the first liquid chamber or the second liquid chamber and the liquid in the first liquid chamber or the second liquid chamber is suppressed to be small, and the generation of the vortex caused by the difference in flow velocity and the generation of air bubbles caused by this vortex can be suppressed. Furthermore, even if the air bubbles are generated, the plurality of fine holes are disposed, and thus the generated air bubbles can be separated. The mergence and growth of the air bubbles are suppressed, so that the air bubbles can be easily maintained in a finely dispersed state. Even if the air bubbles are generated not in the first liquid chamber or the second liquid chamber but in the restricted passageway, when the air bubbles pass the fine holes, the air bubbles can be divided into fine air bubbles, and then be dispersed.

As described above, the generation of air bubbles itself can be suppressed. For example, even if the air bubbles are generated, the air bubbles can be easily maintained in a finely dispersed state. Thus, even if the cavitation collapse in which the air bubbles collapse is generated, the generated abnormal sound can be suppressed to be small.

The plurality of fine holes are disposed in the first barrier wall or the second barrier wall in parallel to a swirling direction of the swirling flow of the liquid formed in the vortex chamber, and the ratio of the opening area or the projection area of the minimum cross section in the fine holes occupied a per predetermined area in the first or second barrier wall may gradually increase from the rear side to the front side in the swirling direction.

When the swirling flow of the liquid is formed in the vortex chamber, the pressure loss of the liquid occurs, and thus the flow velocity of the liquid is gradually reduced from the rear side to the front side in the swirling direction. That is, as the liquid by which the swirling flow is formed is located at the rear side in the swirling direction, the inertial force directed outward in the direction (hereinafter referred to as "radial direction for swirling") perpendicular to the central axis of the vortex chamber in the top view of the vibration damping device is great.

Here, the ratio gradually increases from the rear side to the front side in the swirling direction, and the ratio can be suppressed at the rear side in the swirling direction at which the flow velocity of the liquid is high. Therefore, the liquid by which the swirling flow is formed is inhibited from flowing out of the vortex chamber through the fine holes located at the rear side in the swirling direction among the plurality of fine holes due to the inertial force acting on the liquid, and the liquid can also flow out of the fine holes located at the front side in the swirling direction. Thereby, a large quantity of liquid can be inhibited from locally flowing out of the fine holes located at the rear side in the swirling direction at a high speed, and the liquid flows out of all the plurality of fine holes while suppressing a variation in flow velocity, so that the generation of air bubbles can be effectively suppressed.

In addition, without departing from the gist of the present invention, the components in the above embodiment can be appropriately substituted with well-known components, and they may be appropriately combined with the modification mentioned above.

According to the present invention, occurrence of abnormal sound caused by cavitation collapse can be suppressed with a simple structure without reducing vibration damping characteristics.

REFERENCE SIGNS LIST

10 Vibration damping device
11 First mounting member
12 Second mounting member
13 Elastic body
14 Main liquid chamber (first liquid chamber)
15 Auxiliary liquid chamber (second liquid chamber)
16 Partition member
19 Liquid chamber
24 Restricted passageway
25 Main body flow path
26 First communication part
26a Fine hole
27 Second communication part
29 Vortex chamber
34 First barrier wall
35 Second barrier wall
L Liquid
T Swirling direction

What is claimed is:

1. A vibration damping device that is a liquid-sealed vibration damping device, comprising:
a first mounting member having a tubular shape coupled to any one of a vibration generating part or a vibration receiving part, and a second mounting member coupled to the other rest of the vibration generating part or the vibration receiving part that is not coupled to the first mounting member;
an elastic body elastically coupling the first and second mounting members; and
a partition member partitioning a liquid chamber that is inside the first mounting member and is sealed with a liquid into a first liquid chamber and a second liquid chamber,
wherein the partition member is formed with a restricted passageway that causes the first liquid chamber and the second liquid chamber to communicate with each other,
the restricted passageway includes a first communication part that is formed in a first barrier wall facing the first liquid chamber and opens to the first liquid chamber, a second communication part that is formed in a second barrier wall facing the second liquid chamber and opens to the second liquid chamber, and a main body flow path that causes the first communication part and the second communication part to communicate with each other, at least one of the first communication part and the second communication part includes a plurality of fine holes that pass through the first barrier wall or the second barrier wall, a vortex chamber is disposed in a connection portion of the main body flow path with at least one of the first communication part and the second communication part, forms a swirling flow of the liquid depending on a flow velocity of the liquid from the other of the first communication part and the second communication part, and is configured to cause the liquid to flow out through the fine holes, and the main body flow path opens from a circumferential direction of the vortex chamber.

2. The vibration damping device according to claim 1, wherein:

the plurality of fine holes are disposed in the first barrier wall or the second barrier wall in parallel to a swirling direction of the swirling flow of the liquid which is formed in the vortex chamber; and a ratio of an opening area or a projection area of a minimum cross section in the fine holes occupied per a predetermined area in the first or second barrier wall gradually increases from a rear side to a front side in the swirling direction.

3. The vibration damping device according to claim 1, wherein:

the main body flow path extends to a circumferential direction of the vibration damping device.

4. The vibration damping device according to claim 1, wherein:

the plurality of fine holes are formed in the lateral surface of the vortex chamber.

* * * * *